United States Patent
Guan et al.

(10) Patent No.: US 11,283,555 B2
(45) Date of Patent: Mar. 22, 2022

(54) PACKET TRANSMISSION METHOD, NETWORK COMPONENT, AND COMPUTER-READABLE STORAGE MEDIUM

(71) Applicant: HUAWEI TECHNOLOGIES CO., LTD., Guangdong (CN)

(72) Inventors: Bo Guan, Shenzhen (CN); Mingli Zhang, Nanjing (CN); Naiqiang Qiao, Nanjing (CN); Boyuan Yu, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/818,394

(22) Filed: Mar. 13, 2020

(65) Prior Publication Data
US 2020/0220668 A1   Jul. 9, 2020

Related U.S. Application Data

(63) Continuation of application No. PCT/CN2018/094008, filed on Jul. 2, 2018.

(30) Foreign Application Priority Data

Sep. 14, 2017   (CN) .......................... 201710828719.8

(51) Int. Cl.
*H04L 12/28* (2006.01)
*H04L 1/18* (2006.01)
(Continued)

(52) U.S. Cl.
CPC .......... *H04L 1/1841* (2013.01); *H04L 1/1848* (2013.01); *H04L 45/24* (2013.01); *H04L 49/9057* (2013.01)

(58) Field of Classification Search
CPC ... H04L 47/34; H04L 49/9057; H04L 69/324; H04L 49/552; H04L 69/22; H04L 1/1841; H04L 1/1848; H04L 45/24
See application file for complete search history.

(56) References Cited

U.S. PATENT DOCUMENTS

2002/0191594 A1*  12/2002  Itoh ....................... H04L 47/263
                                                       370/352
2012/0144062 A1*   6/2012  Livet ................... H04W 60/005
                                                       709/239

(Continued)

FOREIGN PATENT DOCUMENTS

CN   102404077 A   4/2012
CN   103326831 A   9/2013
(Continued)

OTHER PUBLICATIONS

Improving multipath TCP for latency sensitive flows in the cloud (Year: 2016).*
(Continued)

*Primary Examiner* — Atique Ahmed
(74) *Attorney, Agent, or Firm* — Womble Bond Dickinson (US) LLP

(57) ABSTRACT

A packet transmission method includes: receiving packets on a plurality of subflow connections of a multipath transmission control protocol (MPTCP) connection, and determining, based on the received packets, that packets at an MPTCP layer are out of order; determining that a blocking packet causing out-of-order is not received within a tolerance time, where the tolerance time is less than a largest RTO in RTOs of the plurality of subflow connections; and sending, by the network component, a retransmission instruction packet of the blocking packet on a target subflow connection in the plurality of subflow connections, where the retransmission instruction packet is used to instruct a (Continued)

sending device of the blocking packet to retransmit the blocking packet. Thus, there is no need to trigger retransmission after a subflow RTO expires, thereby shortening a delay.

20 Claims, 5 Drawing Sheets

(51) Int. Cl.
*H04L 45/24* (2022.01)
*H04L 49/9057* (2022.01)

(56) References Cited

U.S. PATENT DOCUMENTS

| | | | | |
|---|---|---|---|---|
| 2012/0226802 | A1* | 9/2012 | Wu | H04L 1/1887 709/224 |
| 2013/0195106 | A1* | 8/2013 | Calmon | H04L 69/14 370/389 |
| 2014/0341023 | A1* | 11/2014 | Kim | H04W 28/0278 370/230.1 |
| 2016/0127083 | A1 | 5/2016 | Li | |
| 2016/0205586 | A1* | 7/2016 | Kim | H04W 28/06 370/230 |
| 2016/0212759 | A1* | 7/2016 | Schliwa-Bertling | H04L 45/245 |
| 2017/0085484 | A1* | 3/2017 | Hellander | H04W 24/08 |
| 2017/0156078 | A1* | 6/2017 | Lee | H04L 45/02 |
| 2017/0187497 | A1 | 6/2017 | Walid et al. | |

FOREIGN PATENT DOCUMENTS

| | | |
|---|---|---|
| CN | 103346963 A | 10/2013 |
| CN | 104104608 A | 10/2014 |
| EP | 2996275 A1 | 3/2016 |
| JP | 2008526132 A | 7/2008 |
| JP | 2014530564 A | 11/2014 |
| JP | 2017011332 A | 1/2017 |
| WO | 2008032750 A1 | 3/2008 |
| WO | 2012119214 A1 | 9/2012 |

OTHER PUBLICATIONS

RFC 6824—TCP Extensions for Multipath Operation with Multiple Addresses (Year: 2013).*
IEEE: improving multipath TCP for latency sensitive flows in the cloud; 2016 (Year: 2016).*
RFC 6824—TCP Extensions for Multipath Operation with Multiple Addresses; Jan. 2013 (Year: 2013).*
A. Ford et al: TCP Extensions for Multipath Operation with Multiple Addresses Jan. 2013 Request for Comments: 6824 total 64 pages.
Wang Wei et al: "Improving Mu[tipath TCP for Latency Sensitive Flows in the Cloud", Oct. 3, 2016 (Oct. 3, 2016); pp. 45-50,XP033019057.

* cited by examiner

PACKET TRANSMISSION METHOD, NETWORK COMPONENT, AND COMPUTER-READABLE STORAGE MEDIUM

CROSS-REFERENCE TO RELATED APPLICATIONS

This application is a continuation of International Application No. PCT/CN2018/094008, filed on Jul. 2, 2018, which claims priority to Chinese Patent Application No. 201710828719.8, filed on Sep. 14, 2017. The disclosures of the aforementioned applications are hereby incorporated by reference in their entireties.

TECHNICAL FIELD

The present disclosure relates to the communications field, and in particular, to a packet transmission method, a network component, and a computer-readable storage medium.

BACKGROUND

With development of network convergence, multiple access (sending data to a user terminal through a plurality of channels) is to become one of key technologies for improving user experience in future. A biggest difference from current single access lies in that data should be distributed to the user terminal through the plurality of channels in the multiple access.

Based on a transmission control protocol (TCP) at a transport layer, the Internet Engineering Task Force (IETF) issued a latest formal multipath transmission control protocol (MPTCP) standard RFC6824 at the beginning of 2013. The MPTCP is extension of the TCP protocol, and is fully compatible with the TCP protocol. The MPTCP protocol is a transport layer protocol in which concurrent transmission is performed through a plurality of paths, which may improve an end-to-end throughput rate and a network usage, but increase redundancy. A hierarchy of the MPTCP is shown in FIG. 1. An MPTCP layer is added between a socket layer and a TCP layer of a TCP/Internet protocol (IP) protocol stack architecture, and is responsible for managing a plurality of TCP submodules, such as a TCP 1, a TCP 2, . . . , and a TCP n.

FIG. 2 is a schematic diagram of a two-layer sequence number of an MPTCP. The MPTCP implements reliable concurrent multipath transmission by using a two-layer sequence number mechanism. A lower-layer subflow sequence number (SSN) pertains to a TCP subflow, and is independently maintained by each TCP subflow. An upper-layer data sequence number (DSN) is maintained on a control plane of the MPTCP, and is globally unique. A receiver reassembles TCP packets based on DSNs after receiving the packets of subflows.

The MPTCP concurrent multipath transmission brings a plurality of advantages: Reliability of a network is ensured, and in addition, network bandwidth usage is increased, so as to transfer traffic from a congested link to an idle link.

Bonding access (BA), a typical application scenario of the MPTCP, is shown in FIG. 3, and FIG. 3 is a schematic diagram of a service scenario of a hybrid access network. A computer is connected to a home gateway (HG), and then is connected to a hybrid access aggregation point (HAAP) over an LTE network, a digital subscriber line (DSL), or Wi-Fi.

In the hybrid access scenario, the HG and the HAAP are connected over a plurality of links such as the DSL, a mobile communications network (for example, the LTE network), and the Wi-Fi. In other words, the HG and the HAAP may be connected in the following manners, for example, over the DSL, the LTE, and the Wi-Fi.

In a multilink access network environment, different paths have a specific difference, and have a great difference in a delay, a bandwidth, and a packet loss rate. During multipath transmission, packets are out of order due to the difference when being reassembled at a receive end. Consequently, a queuing delay of a packet at the receive end is increased, and as a result, a delay-sensitive service such as a video service is greatly affected. Therefore, when multilink parallel transmission in the BA scenario is performed, a related mechanism should be used to reduce a delay caused by out-of-order.

Currently, the receive end first waits for an arrival of a packet, and then sends a repeated ACK after receiving a subsequent packet. After receiving the ACK, a transmit end does not immediately trigger fast retransmission at the MPTCP layer, but first triggers fast retransmission by using a fast retransmission mechanism of a subflow, and then triggers retransmission at the MPTCP layer after a subflow retransmission timeout (RTO) expires.

Retransmission at the MPTCP layer should be triggered after the subflow RTO expires, and as a result, a delay is relatively long.

SUMMARY

Embodiments of the present disclosure provide a packet transmission method, a network component, and a computer-readable storage medium, and there is no need to trigger retransmission after a subflow RTO expires, thereby shortening a delay.

One embodiment of the present disclosure provides a packet transmission method, and the method includes:
receiving, by a network component, packets on a plurality of subflow connections of a multipath transmission control protocol (MPTCP) connection, and determining, based on the received packets, that packets at an MPTCP layer are out of order;
determining, by the network component, that a blocking packet causing out-of-order is not received within a tolerance time, where the tolerance time is less than a largest retransmission timeout (RTO) in RTOs of the plurality of subflow connections; and sending, by the network component, a retransmission instruction packet of the blocking packet on a target subflow connection in the plurality of subflow connections, where the retransmission instruction packet is used to instruct a sending device of the blocking packet to retransmit the blocking packet.

With reference to the first aspect, in a first possible implementation, the determining, based on the received packets, that packets at an MPTCP layer are out of order includes:
performing packet assembly based on data sequence numbers (DSNs) of the arriving packets in the plurality of subflow connections of the MPTCP, and when determining that the DSNs of the arriving packets are nonconsecutive, determining that the packets at the MPTCP layer are out of order.

With reference to the first aspect, in the foregoing possible implementation, the tolerance time is determined based on a largest round trip time (RTT) in RTTs of the plurality of subflow connections and an RTT of a subflow connection in which a packet that is recently received when the packets at the MPTCP layer are out of order is located.

With reference to one embodiment, in a first case of the foregoing possible implementation, the tolerance time is equal to ½ of ($RTT_{max}$–$RTT_{cur}$), the $RTT_{max}$ is the largest RTT in the RTTs of the plurality of subflow connections, and the $RTT_{cur}$ is the RTT of the subflow connection in which the packet that is recently received when the packets at the MPTCP layer are out of order is located.

With reference to one embodiment, in the foregoing possible implementation, before the sending, by the network component, a retransmission instruction packet of the blocking packet on a target subflow connection in the plurality of subflow connections, the method further includes:

selecting a subflow connection with a shortest estimated delay from the plurality of subflow connections as the target subflow connection.

With reference to the first aspect, in the foregoing possible implementation, the retransmission instruction packet includes an identifier, and the identifier is used to identify that the retransmission instruction packet is a packet that is used to instruct the sending device of the blocking packet to retransmit the blocking packet.

With reference to one embodiment, in a first case of the foregoing possible implementation, the identifier is located in a flag bit in a data sequence signal (DSS) option of the MPTCP.

With reference to the first aspect, in the foregoing possible implementation, the sending a retransmission instruction packet of the blocking packet on a target subflow connection in the plurality of subflow connections includes:

sending a repeated duplicate acknowledgment packet of the blocking packet for three consecutive times on the target subflow connection.

With reference to one embodiment, in the foregoing possible implementation, the network component is a home gateway (HG), a hybrid access aggregation point (HAAP), or an access router (AR).

One embodiment of the present disclosure provides a packet transmission method, and the method includes:

identifying, by a network component, a retransmission instruction packet of a blocking packet from packets received on a plurality of subflow connections of a multipath transmission control protocol (MPTCP);

determining, by the network component, a data sequence number DSN of the blocking packet based on the retransmission instruction packet; and resending, by the network component, the blocking packet corresponding to the DSN on a subflow connection that receives the retransmission instruction packet.

With reference to one embodiment, in a first possible implementation, the retransmission instruction packet includes an identifier, and the identifier is used to identify that the retransmission instruction packet is used to instruct a sending device of the blocking packet to retransmit the blocking packet; and the identifying a retransmission instruction packet of a blocking packet includes: identifying the retransmission instruction packet of the blocking packet by using the identifier of the retransmission instruction packet.

With reference to one embodiment, in a second possible implementation, the identifying a retransmission instruction packet of a blocking packet includes:

identifying the retransmission instruction packet of the blocking packet by receiving a repeated duplicate acknowledgment packet of the blocking packet for three consecutive times.

With reference to one embodiment, in the foregoing possible implementation, the network component is a home gateway (HG), a hybrid access aggregation point (HAAP), or an access router (AR).

One embodiment of the present disclosure provides a network component, and the network component includes:

a determining module, configured to: receive packets on a plurality of subflow connections of a multipath transmission control protocol (MPTCP) connection, and determine, based on the received packets, that packets at an MPTCP layer are out of order;

a judging module, configured to determine that a blocking packet causing out-of-order is not received within a tolerance time, where the tolerance time is less than a largest retransmission timeout (RTO) in RTOs of the plurality of subflow connections; and a sending module, configured to send a retransmission instruction packet of the blocking packet on a target subflow connection in the plurality of subflow connections, where the retransmission instruction packet is used to instruct a sending device of the blocking packet to retransmit the blocking packet.

With reference to one embodiment, in a first possible implementation, the determining module is specifically configured to: perform packet assembly based on data sequence numbers (DSNs) of the arriving packets in the plurality of subflow connections of the MPTCP, and when determining that the DSNs of the arriving packets are nonconsecutive, determine that the packets at the MPTCP layer are out of order.

With reference to one embodiment, in the foregoing possible implementation, the tolerance time is determined based on a largest round trip time (RTT) in RTTs of the plurality of subflow connections and an RTT of a subflow connection in which a packet that is recently received when the packets at the MPTCP layer are out of order is located.

With reference to one embodiment, in a first case of the foregoing possible implementation, the tolerance time is equal to ½ of ($RTT_{max}$–$RTT_{cur}$), $RTT_{max}$ is the largest RTT in the RTTs of the plurality of subflow connections, and the $RTT_{cur}$ is the RTT of the subflow connection in which the packet that is recently received when the packets at the MPTCP layer are out of order is located.

With reference to one embodiment, in the foregoing possible implementation, the sending module is further configured to select a subflow connection with a shortest estimated delay from the plurality of subflow connections as the target subflow connection.

With reference to one embodiment, in the foregoing possible implementation, the retransmission instruction packet includes an identifier, and the identifier is used to identify that the retransmission instruction packet is a packet that is used to instruct the sending device of the blocking packet to retransmit the blocking packet.

With reference to one embodiment, in a first case of the foregoing possible implementation, the identifier is located in a flag bit in a data sequence signal (DSS) option of the MPTCP.

With reference to one embodiment, in the foregoing possible implementation, the sending module is specifically configured to send a repeated duplicate acknowledgment packet of the blocking packet for three consecutive times on the target subflow connection.

With reference to one embodiment, in the foregoing possible implementation, the network component is a home gateway (HG), a hybrid access aggregation point (HAAP), or an access router (AR).

One embodiment of the present disclosure provides a network component, and the network component includes:

an identification module, configured to identify a retransmission instruction packet of a blocking packet from packets received on a plurality of subflow connections of a multipath transmission control protocol (MPTCP);

a determining module, configured to determine a data sequence number DSN of the blocking packet based on the retransmission instruction packet; and a resending module, configured to resend the blocking packet corresponding to the DSN on a subflow connection that receives the retransmission instruction packet.

With reference to one embodiment, in a first possible implementation, the retransmission instruction packet includes an identifier, and the identifier is used to identify that the retransmission instruction packet is used to instruct a sending device of the blocking packet to retransmit the blocking packet; and the identification module is specifically configured to identify the retransmission instruction packet of the blocking packet by using the identifier of the retransmission instruction packet.

With reference to one embodiment, in a second possible implementation, the identification module is specifically configured to identify the retransmission instruction packet of the blocking packet by receiving a repeated duplicate acknowledgment packet of the blocking packet for three consecutive times.

With reference to one embodiment, in the foregoing possible implementation, the network component is a home gateway (HG), a hybrid access aggregation point (HAAP), or an access router (AR).

One embodiment provides a computer-readable storage medium. The computer-readable storage medium stores an instruction, and when the instruction is run on a computer, the computer is enabled to perform the method in the foregoing aspects.

One embodiment provides a computer program product including an instruction, and when the computer program product is run on a computer, the computer is enabled to perform the method in the foregoing aspects.

It may be learned from the foregoing technical solutions that the network component receives the packets on the plurality of subflow connections of the MPTCP connection, and determines, based on the received packets, that the packets at the MPTCP layer are out of order; the network component determines that the blocking packet causing out-of-order is not received within the tolerance time; and the network component sends the retransmission instruction packet of the blocking packet on the target subflow connection in the plurality of subflow connections. In this way, the sending device of the blocking packet may immediately retransmit the blocking packet after receiving the retransmission instruction packet, and there is no need to trigger retransmission after the subflow RTO expires. In addition, the tolerance time is less than the largest RTO in the RTOs of the plurality of subflow connections. Therefore, compared with a prior-art technical solution in which retransmission is triggered after the subflow RTO expires, a delay in the foregoing technical solutions is relatively short.

BRIEF DESCRIPTION OF DRAWINGS

The present disclosure can be better understood from the following description of specific implementations of the present disclosure with reference to the accompanying drawings, and the same or similar reference numerals indicate the same or similar features.

DESCRIPTION OF EMBODIMENTS

In the embodiments of the present disclosure, a network component determines, based on received packets, that packets at an MPTCP layer are out of order, and sends a retransmission instruction packet of a blocking packet on a target subflow connection if the blocking packet is still not received within a tolerance time. Because there is no need to trigger retransmission after a subflow RTO expires, a delay is relatively short.

Figure 1:
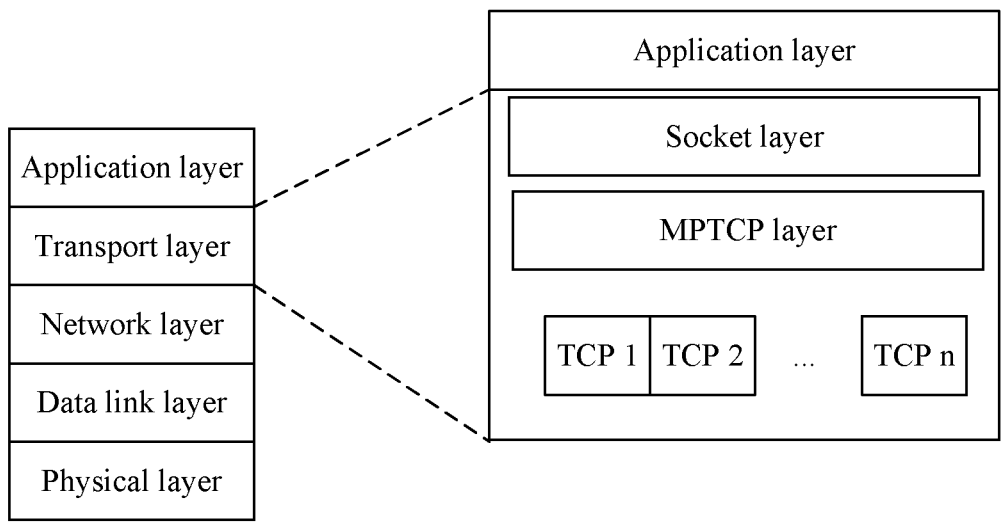
FIG. 1 is a schematic structural diagram of an MPTCP.
Figure 2:
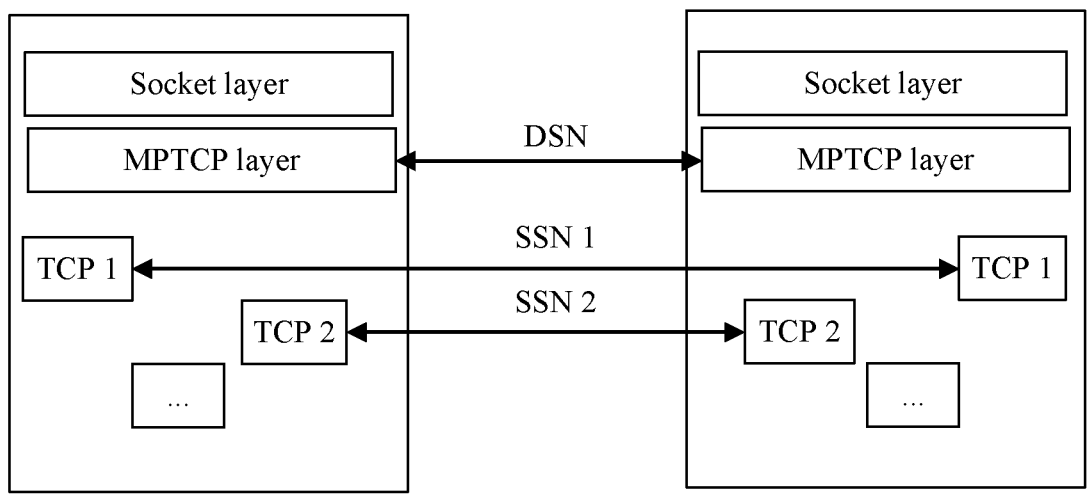
FIG. 2 is a schematic diagram of a two-layer sequence number of an MPTCP.
Figure 3:
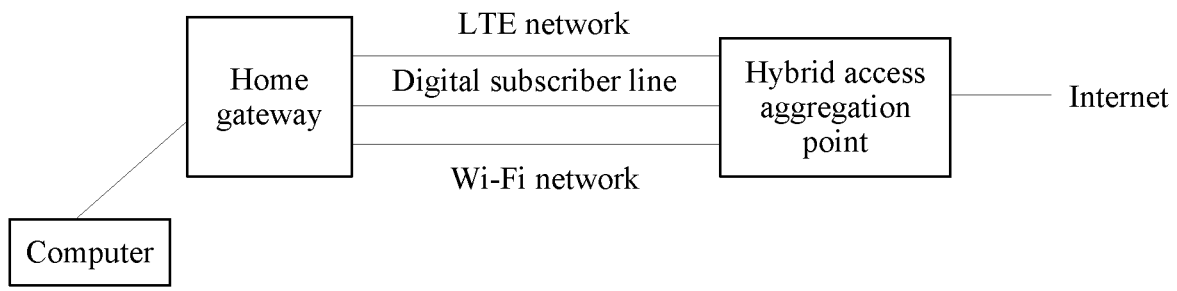
FIG. 3 is a schematic diagram of a service scenario of a hybrid access network.
Figure 4:
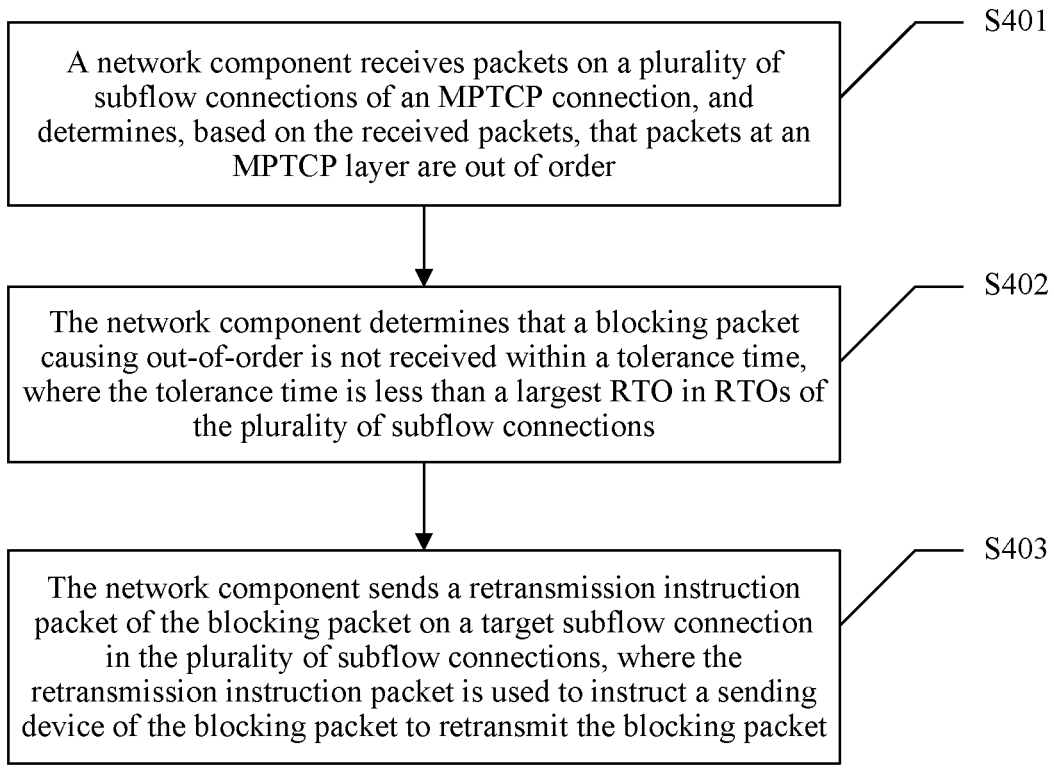
FIG. 4 is a schematic flowchart of a packet transmission method according to an embodiment of the present disclosure.

FIG. 4 is a schematic flowchart of a packet transmission method according to an embodiment of the present disclosure. This embodiment of the present invention may be performed by a network component, specifically including the following steps.

Figure 5:
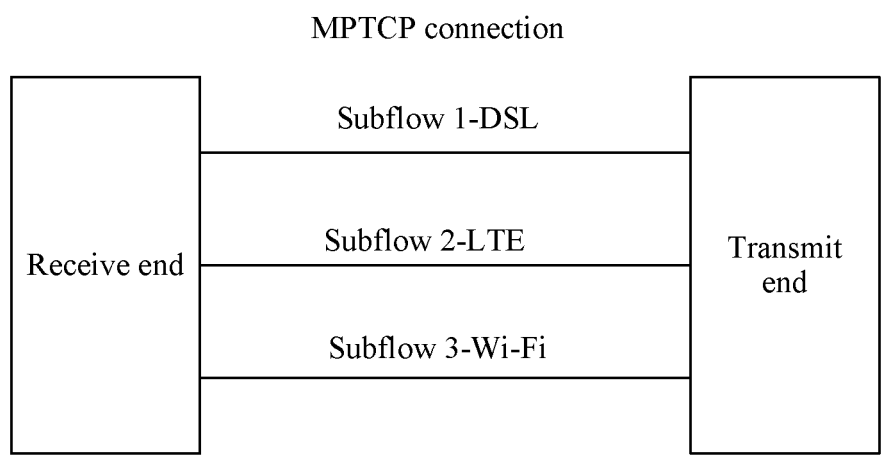
FIG. 5 is a schematic diagram of an MPTCP connection according to an embodiment of the present disclosure.

FIG. 5 is a schematic diagram of an MPTCP connection according to an embodiment of the present disclosure. Data is parallelly transmitted between a receive end and a transmit end on three subflow connections to which the MPTCP is applied, and the subflow connection is also referred to as a subflow.

A subflow connection 1 uses a DSL connection, a subflow connection 2 uses an LTE connection, and a subflow connection 3 uses a Wi-Fi connection. The following uses the receive end as an example for description.

S401. The network component receives packets on a plurality of subflow connections of an MPTCP connection, and determines, based on the received packets, that packets at an MPTCP layer are out of order.

The network component receives the packets on the plurality of subflow connections of the MPTCP connection. The MPTCP implements reliable concurrent multipath transmission by using a two-layer sequence number mechanism. A lower-layer SSN pertains to a TCP subflow, and is independently maintained by each TCP subflow. An upper-layer DSN is maintained on a control plane of the MPTCP, and is globally unique. Therefore, the determining, based on the received packets, that packets at an MPTCP layer are out of order includes the following two steps.

Step 1: Determine whether packets received on a subflow connection are consecutive.

At a TCP layer, because an SSN is a subflow sequence number, and if SSN numbers of packets received on a same subflow connection are consecutive, it indicates that the packets received on this subflow connection are consecutive, whether the packets received on the subflow connection are consecutive may be determined based on the SSNs.

For example, the network component receives packets whose SSNs are respectively B, A, and C. Because the SSNs of the received packets may be successively ranked, it indicates that the packets received on this subflow connection are consecutive.

For example, the network component receives packets whose SSNs are respectively d, c, and a. Because the SSNs of the packets may not be successively ranked, it indicates that the packets received on this subflow connection are nonconsecutive.

If it is determined that the packets received on the subflow connection are consecutive, step 2 is performed, to be specific, whether the packets at the MPTCP layer are consecutive is determined; or if it is determined that the packets received on the subflow connection are nonconsecutive, processing is performed by using a standard TCP mechanism. For example, the receive end replies with, for three times on a subflow connection at which not all packets arrive, a repeated ACK that is used to indicate expectation of receiving a packet that does not arrive, and after receiving the ACK repeated for three times, the transmit end fast retransmits, on the same subflow connection, the packet that does not arrive.

Step 2. Determine whether the packets at the MPTCP layer are consecutive.

At the MPTCP layer, because a DSN is globally unique, and if DSN numbers of packets received on a same MPTCP connection are consecutive, it indicates that the packets at the MPTCP layer are consecutive, whether the packets at the MPTCP layer are consecutive may be determined based on the DSNs.

For example, the network component receives packets whose DSNs are respectively 2, 1, and 3. Because the DSNs of the packets may be successively ranked, it indicates that the packets at the MPTCP layer are consecutive. After the consecutive packets are successfully assembled based on the DSNs, the packets obtained after packet assembly succeeds may be submitted to an application. For example, the packets obtained after packet assembly succeeds may be submitted to an application layer of the network component, for example, a video application.

For example, the network component receives packets whose DSNs are respectively 4, 3, and 1. Because a packet whose DSN is 2 is not received, the packets at the MPTCP layer are nonconsecutive, in other words, the packets at the MPTCP layer are out of order.

The packets at the MPTCP layer are out of order due to a relatively large delay or a packet loss of a subflow connection.

For example, an MPTCP connection between the network component and a communication peer end device includes a subflow connection 1 and a subflow connection 2. The communication peer end device transmits a packet 1 whose SSN is a and DSN is 1, a packet 2 whose SSN is b and DSN is 2, and a packet 4 whose SSN is c and DSN is 4 on the subflow connection 1, and transmits a packet 3 whose SSN is A and DSN is 3 and a packet 5 whose SSN is B and DSN is 5 on the subflow connection 2. The network component receives the packet 1, the packet 2, the packet 3, and the packet 5. The SSN of the packet 1 and the SSN of the packet 2 are consecutive, and the SSN of the packet 3 and the SSN of the packet 5 are also consecutive. Therefore, it is determined in step 1 that the packets received on each of the subflow connection 1 and the subflow connection 2 are consecutive. The DSN of the packet 3 and the DSN of the packet 5 are nonconsecutive. Therefore, it is determined in step 2 that the packets at the MPTCP layer are nonconsecutive, in other words, the packets at the MPTCP layer are out of order. The packet 4 is a blocking packet.

That is, the packets at the MPTCP layer are out of order mainly because the blocking packet is not received, and the blocking packet is not received due to a relatively large delay or a packet loss.

S402. The network component determines that a blocking packet causing out-of-order is not received within a tolerance time, where the tolerance time is less than a largest RTO in RTOs of the plurality of subflow connections.

Because a delay of the subflow connection becomes larger or a packet loss occurs, the packets at the MPTCP layer are out of order, and the network component should wait to receive the blocking packet within the tolerance time. If the blocking packet arrives within the tolerance time, packet assembly is performed based on the blocking packet, and then packets obtained after packet assembly succeeds are submitted to the application; or if the blocking packet is not received within the tolerance time, S403 is performed.

Each subflow connection has a corresponding RTO, and the tolerance time should be less than the largest RTO in the RTOs of the plurality of subflow connections.

S403. The network component sends a retransmission instruction packet of the blocking packet on a target subflow connection in the plurality of subflow connections, where the retransmission instruction packet is used to instruct a sending device of the blocking packet to retransmit the blocking packet.

The network component sends the retransmission instruction packet of the blocking packet on the target subflow connection in the plurality of subflow connections of the MPTCP. Sending the retransmission instruction packet aims to instruct the sending device of the blocking packet to retransmit the blocking packet.

In this embodiment of the present disclosure, the network component determines that the blocking packet is still not received on the plurality of subflow connections of the MPTCP connection within the tolerance time, and then sends the retransmission instruction packet of the blocking packet on the target subflow connection. Because the packets at the MPTCP layer are out of order, and the blocking packet is not received within the tolerance time, retransmission of the blocking packet is triggered by using the retransmission instruction packet, and the delay is relatively short.

In an embodiment of the present disclosure, the determining, based on the received packets, that packets at an MPTCP layer are out of order specifically includes:

Consecutive arriving packets are submitted to the MPTCP layer on the plurality of subflow connections of the MPTCP. In other words, because SSNs of the arriving packets at the TCP layer are consecutive, it indicates that the packets received on the subflow connection are consecutive.

At the MPTCP layer, packet assembly is performed based on DSNs of packets. Because it is found that the blocking packet is not received, it is determined that DSNs of the arriving packets are nonconsecutive, and it is determined that the packets at the MPTCP layer are out of order.

In the foregoing embodiment, the SSNs of the packets are consecutive, and the DSNs of the packets are nonconsecutive. In this case, it indicates that there exists the blocking packet that is not received, and as a result, the packets at the MPTCP layer are out of order.

In an embodiment of the present disclosure, the tolerance time may be determined based on a largest RTT in RTTs of the plurality of subflow connections and an RTT of a subflow connection in which a packet that is recently received when the packets at the MPTCP layer are out of order is located.

Specifically, there are a plurality of subflow connections between the receive end and the transmit end. Each subflow connection has a real-time RTT, and the largest RTT of the plurality of subflow connections is denoted as $RTT_{max}$.

The RTT of the subflow connection in which the packet that is recently received when the packets at the MPTCP layer are out of order is located is denoted as $RTT_{cur}$.

For example, an MPTCP connection between the network component and a communication peer end device includes a subflow connection 1 and a subflow connection 2. The communication peer end device transmits a packet 1 whose SSN is a and DSN is 1, a packet 2 whose SSN is b and DSN is 2, and a packet 4 whose SSN is c and DSN is 4 on the subflow connection 1, and transmits a packet 3 whose SSN is A and DSN is 3 and a packet 5 whose SSN is B and DSN is 5 on the subflow connection 2. The network component receives the packet 1, the packet 2, the packet 3, and the packet 5. The packet 1, the packet 2, the packet 3, and the packet 5 are nonconsecutive due to lack of the packet 4. After the packet 5 is received, it is determined that the packets at the MPTCP layer are out of order, and an RTT of a path in which the packet 5 is located is the $RTT_{cur}$.

For example, the tolerance time is equal to ½ of ($RTT_{max}$–$RTT_{cur}$), and the ½ of ($RTT_{max}$–$RTT_{cur}$) is usually less than the largest RTO in the RTOs of the plurality of subflow connections.

In the foregoing embodiment, the tolerance time may be determined by using the RTT. If the blocking packet is not received within the tolerance time, retransmission of the blocking packet is triggered, so as to shorten a delay.

In an embodiment of the present disclosure, a subflow connection with a shortest estimated delay may be selected from the plurality of subflow connections, and the subflow connection with the shortest estimated delay is used as the target subflow connection. A delay of each subflow connection may be specifically estimated based on an RTT of each subflow connection, and a subflow connection with a smallest RTT is used as the target subflow connection.

To send the retransmission instruction packet as soon as possible, the subflow connection with the shortest estimated delay may be selected as the target subflow connection, and the retransmission instruction packet is transmitted on the target subflow connection.

In an embodiment of the present disclosure, to enable the transmit end to identify the retransmission instruction packet, the retransmission instruction packet may include an identifier, and the identifier is used to identify that the retransmission instruction packet is a packet that is used to instruct the sending device of the blocking packet to retransmit the blocking packet. In other words, after receiving the retransmission instruction packet, the sending device of the blocking packet may identify the retransmission instruction packet by using the identifier, and retransmit a corresponding blocking packet.

In the foregoing example, the identifier is used as a trigger condition for triggering retransmission of the blocking packet, thereby shortening a delay.

In an embodiment of the present disclosure, the identifier in the retransmission instruction packet may be located in a flag bit in a data sequence signal (DSS) option of the MPTCP.

The DSS of the MPTCP indicates a data flow status of a sub-traffic in an MPTCP session. To enable the transmit end to identify the retransmission instruction packet, the flag bit in the DSS of the MPTCP may be filled with the identifier. For example, a sixth flag bit in the DSS of the MPTCP may be filled with the identifier.

In the foregoing example, the transmit end may determine, by using the flag bit in the DSS option of the MPTCP, whether there is a corresponding identifier; and if there is the identifier, the transmit end may identify the retransmission instruction packet sent by the receive end. That is, a packet whose flag bit is filled with the identifier is the retransmission instruction packet.

In an embodiment of the present disclosure, the sending a retransmission instruction packet of the blocking packet on a target subflow connection in the plurality of subflow connections may include: sending a repeated duplicate acknowledgment packet of the blocking packet for three consecutive times on the target subflow connection, where the duplicate acknowledgment packet of the blocking packet is used to indicate expectation of receiving the blocking packet. The duplicate acknowledgment packet sent for three consecutive times is equivalent to the retransmission instruction packet.

If the transmit end receives the duplicate acknowledgment packet repeated for three times, it indicates that the transmit end should retransmit the blocking packet on the target subflow connection.

In the foregoing example, receiving the repeated duplicate acknowledgment packet for three times is used as a trigger condition for triggering retransmission of the blocking packet, thereby shortening a delay.

Figure 6:
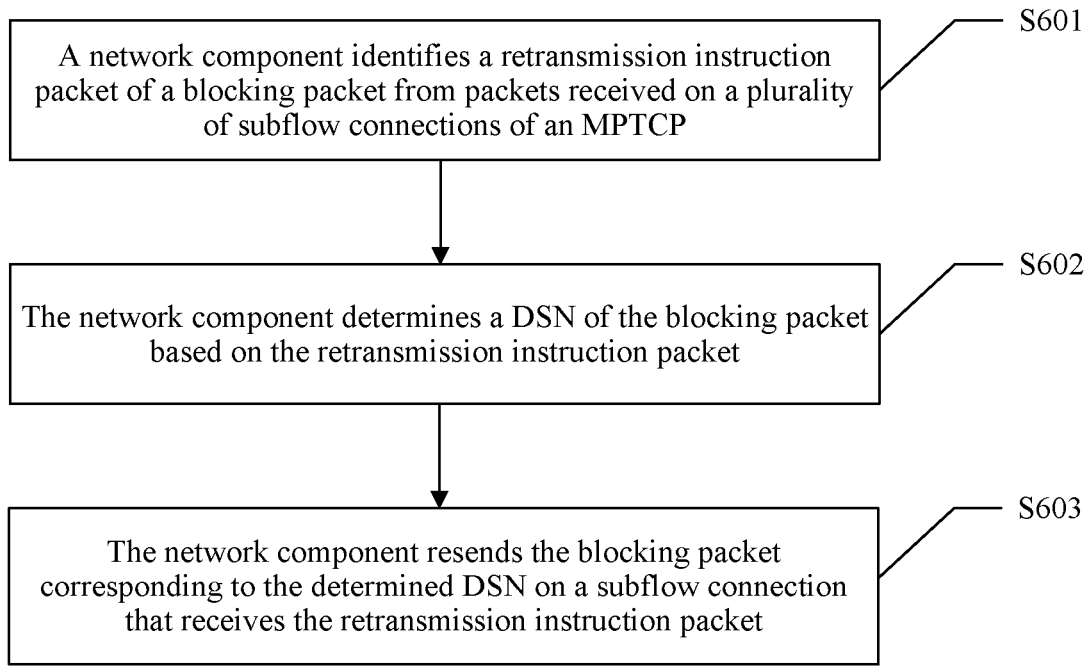
FIG. 6 is a schematic flowchart of a packet transmission method according to another embodiment of the present disclosure.

FIG. 6 is a schematic flowchart of a packet transmission method according to another embodiment of the present disclosure. This embodiment of the present disclosure may be performed by a network component, specifically including the following steps.

S601. The network component identifies a retransmission instruction packet of a blocking packet from packets received on a plurality of subflow connections of an MPTCP.

The network component may identify the retransmission instruction packet from the packets received on the plurality of subflow connections of the MPTCP, and the retransmission instruction packet includes a DSN of the blocking packet.

S602. The network component determines the DSN of the blocking packet based on the retransmission instruction packet.

The blocking packet may be determined in the retransmission instruction packet, and therefore the DSN of the blocking packet may be learned of.

For example, the retransmission instruction packet may include an identifier, and the identifier is used to identify that the retransmission instruction packet is a packet that is used to instruct a sending device of the blocking packet to retransmit the blocking packet. The retransmission instruction packet of the blocking packet may be identified by using the identifier in the retransmission instruction packet. The identifier may be located in a flag bit in a DSS option of the MPTCP.

For another example, if receiving a repeated duplicate acknowledgment packet of the blocking packet for three consecutive times, the network component may identify the retransmission instruction packet.

After identifying the retransmission instruction packet, the network component may determine the DSN of the blocking packet based on the retransmission instruction packet.

S603. The network component resends the blocking packet corresponding to the determined DSN on a subflow connection that receives the retransmission instruction packet.

The network component resends the blocking packet based on the DSN on the subflow connection that receives the retransmission instruction packet. The DSN is a DSN of the blocking packet, so that a receive end receives the blocking packet corresponding to the DSN.

In this embodiment of the present disclosure, after receiving the retransmission instruction packet on the plurality of subflow connections of the MPTCP, the network component identifies the retransmission instruction packet, determines the DSN of the blocking packet based on the retransmission instruction packet, and then resends the blocking packet on the subflow connection based on the DSN. After identifying the retransmission instruction packet, the network component immediately resends the corresponding blocking packet, thereby shortening a delay.

Figure 7:
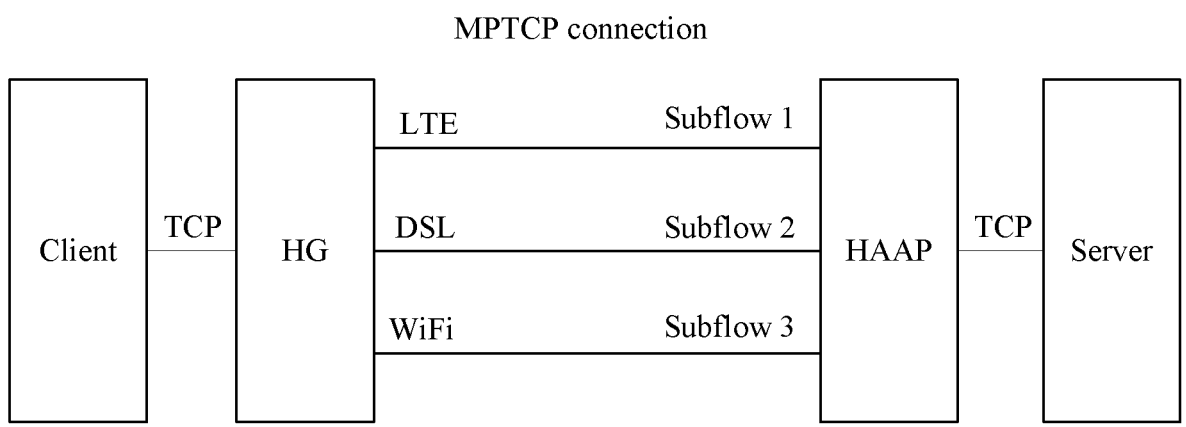
FIG. 7 is a schematic diagram of data transmission in a BA scenario according to an embodiment of the present disclosure.

FIG. 7 is a schematic diagram of data transmission in a BA scenario according to an embodiment of the present disclosure. FIG. 7 may use the technical solutions in FIG. 4 to FIG. 6. For example, the network component in FIG. 4 to FIG. 6 may be an HG or a HAAP.

A client is a client that carries an application by using a TCP protocol, for example, a home computer, a tablet computer, or a mobile phone. The client may be used to access a TCP application, for example, a video on-live.

An HG is a network access device installed at a user's house by an operator. This type of device may have various interfaces at a wide area network (WAN) end, for example, a DSL interface, a Wi-Fi interface, and an LTE interface. These interfaces may be used as different egresses for MPTCP multipath transmission to implement hybrid access.

A HAAP is a device that is responsible for receiving hybrid access requests from different HG devices.

A server is a server that carries an application by using a TCP protocol.

In the BA scenario, MPTCP proxy servers are deployed on the HAAP and the HG; and three MPTCP subflow connections are established between the proxy servers over an LTE link, a DSL link, and a Wi-Fi link. The proxy server of the HG and the proxy server of the HAAP maintain an RTT of each subflow connection.

Due to a packet loss or an excessively large delay of the LTE link, one of the proxy servers (for example, the proxy server of the HG) determines that packets at an MPTCP layer are out of order, selects a target subflow connection, and sends a retransmission instruction packet. The other proxy server (for example, the proxy server of the HAAP) fast retransmits a blocking packet on the target subflow connection immediately after receiving the retransmission instruction packet.

Figure 8:
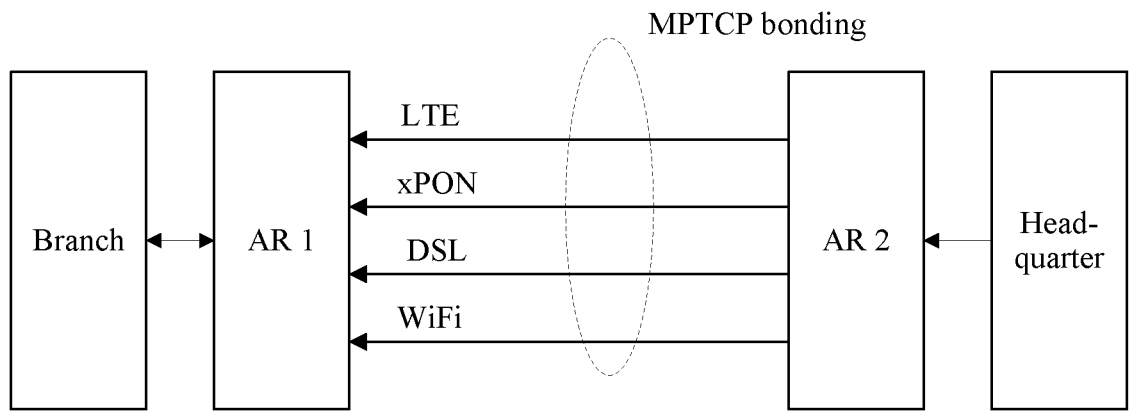
FIG. 8 is a schematic diagram of data transmission in an SDWAN hybrid WAN scenario according to an embodiment of the present disclosure.

FIG. 8 is a schematic diagram of data transmission in a software-defined wide area network-hybrid wide area network (Software-defined Hybrid WAN) scenario according to an embodiment of the present disclosure. FIG. 8 may use the technical solutions in FIG. 4 to FIG. 6. For example, the network component in FIG. 4 to FIG. 6 may be an access router (AR).

In the SDWAN hybrid WAN scenario, there are a plurality of redundant paths between an enterprise branch and an enterprise head-quarter, an MPTCP proxy server is separately deployed on an AR 1 and an AR 2, and a plurality of MPTCP subflow connections are established over an LTE link, an xPON link, a DSL link, and a Wi-Fi link through MPTCP bonding.

A passive optical network (x Passive Optical Network, xPON) includes a cell-based ATM passive optical network (APON), an Ethernet passive optical network (EPON), a gigabit-capable passive optical network (GPON), and the like.

The MPTCP proxy server of the AR 1 maintains an RTT of each subflow connection.

Due to a packet loss or an excessively large delay of the LTE link, the proxy server of the AR 1 determines that packets at an MPTCP layer are out of order, selects a target subflow connection, and sends a retransmission instruction packet, and the proxy server of the AR 2 fast retransmits a blocking packet on the target subflow connection immediately after receiving the retransmission instruction packet.

Figure 9:
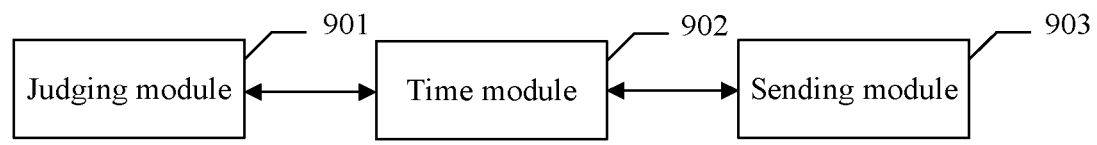
FIG. 9 is a schematic structural diagram of a network component according to an embodiment of the present disclosure.

FIG. 9 is a schematic structural diagram of a network component according to an embodiment of the present disclosure, and the network component corresponds to the packet transmission method. The network component specifically includes the following modules.

A determining module 901 is configured to: receive packets on a plurality of subflow connections of an MPTCP connection, and determine, based on the received packets, that packets at an MPTCP layer are out of order.

For example, an MPTCP connection between the network component and a communication peer end device includes a subflow connection 1 and a subflow connection 2. The communication peer end device transmits a packet 1 whose SSN is a and DSN is 1, a packet 2 whose SSN is b and DSN is 2, and a packet 4 whose SSN is c and DSN is 4 on the subflow connection 1, and transmits a packet 3 whose SSN is A and DSN is 3 and a packet 5 whose SSN is B and DSN is 5 on the subflow connection 2. The network component receives the packet 1, the packet 2, the packet 3, and the packet 5. The SSN of the packet 1 and the SSN of the packet 2 are consecutive, and the SSN of the packet 3 and the SSN of the packet 5 are also consecutive. Therefore, it is determined in step 1 that the packets received on each of the subflow connection 1 and the subflow connection 2 are consecutive. The DSN of the packet 3 and the DSN of the packet 5 are nonconsecutive. Therefore, it is determined in step 2 that the packets at the MPTCP layer are nonconsecutive, in other words, the packets at the MPTCP layer are out of order. The packet 4 is a blocking packet.

That is, the packets at the MPTCP layer are out of order mainly because the blocking packet is not received, and the blocking packet is not received due to a relatively large delay or a packet loss.

A judging module 902 is configured to determine that a blocking packet causing out-of-order is not received within a tolerance time, where the tolerance time is less than a largest RTO in RTOs of the plurality of subflow connections.

Because a delay of the subflow connection becomes larger or a packet loss occurs, the packets at the MPTCP layer are out of order, and the network component should wait to receive the blocking packet within the tolerance time. If the blocking packet arrives within the tolerance time, packet assembly is performed based on the blocking packet, and then packets obtained after packet assembly succeeds are submitted to an application; or if the blocking packet is not received within the tolerance time, a sending module 903 sends a retransmission instruction packet.

Each subflow connection has a corresponding RTO, and the tolerance time should be less than the largest RTO in the RTOs of the plurality of subflow connections.

The sending module 903 is configured to send a retransmission instruction packet of the blocking packet on a target subflow connection in the plurality of subflow connections, where the retransmission instruction packet is used to instruct a sending device of the blocking packet to retransmit the blocking packet.

The sending module 903 sends the retransmission instruction packet of the blocking packet on the target subflow connection in the plurality of subflow connections of the MPTCP. Sending the retransmission instruction packet aims to instruct the sending device of the blocking packet to retransmit the blocking packet.

In this embodiment of the present disclosure, it is determined that the blocking packet is still not received on the plurality of subflow connections of the MPTCP connection within the tolerance time, and then the retransmission instruction packet of the blocking packet is sent on the target subflow connection. Because the packets at the MPTCP layer are out of order, and the blocking packet is not received within the tolerance time, retransmission of the blocking packet is triggered by using the retransmission instruction packet, and the delay is relatively short.

In an embodiment of the present disclosure, the determining module 901 is specifically configured to: perform packet assembly based on DSNs of the arriving packets in the plurality of subflow connections of the MPTCP, and when determining that the DSNs of the arriving packets are nonconsecutive, determine that the packets at the MPTCP layer are out of order.

In the foregoing embodiment, the SSNs of the packets are consecutive, and the DSNs of the packets are nonconsecutive. In this case, it indicates that there exists the blocking packet that is not received, and as a result, the packets at the MPTCP layer are out of order.

In an embodiment of the present disclosure, the tolerance time may be determined based on a largest RTT in RTTs of the plurality of subflow connections and an RTT of a subflow connection in which a packet that is recently received when the packets at the MPTCP layer are out of order is located.

Specifically, there are a plurality of subflow connections between a receive end and a transmit end. Each subflow connection has a real-time RTT, and the largest RTT of the plurality of subflow connections is denoted as $RTT_{max}$.

The RTT of the subflow connection in which the packet that is recently received when the packets at the MPTCP layer are out of order is located is denoted as $RTT_{cur}$.

For example, the tolerance time is equal to ½ of ($RTT_{max}-RTT_{cur}$), and the ½ of ($RTT_{max}-RTT_{cur}$) is usually less than the largest RTO in the RTOs of the plurality of subflow connections.

In the foregoing embodiment, the tolerance time may be determined by using the RTT. If the blocking packet is not received within the tolerance time, retransmission of the blocking packet is triggered, so as to shorten a delay.

In an embodiment of the present disclosure, to enable the transmit end to identify a duplicate acknowledgment packet, the sending module 903 is further configured to select a subflow connection with a shortest estimated delay from the plurality of subflow connections as the target subflow connection.

In the foregoing example, to send the retransmission instruction packet as soon as possible, the subflow connection with the shortest estimated delay may be selected as the target subflow connection, and the retransmission instruction packet is transmitted on the target subflow connection.

In an embodiment of the present disclosure, the retransmission instruction packet may include an identifier, and the identifier may be used to identify that the retransmission instruction packet is a packet that is used to instruct the sending device of the blocking packet to retransmit the blocking packet. In other words, after receiving the retransmission instruction packet, the sending device of the blocking packet may identify the retransmission instruction packet by using the identifier, and retransmit a corresponding blocking packet.

In the foregoing example, the identifier is used as a trigger condition for triggering retransmission of the blocking packet, thereby shortening a delay.

In an embodiment of the present disclosure, the identifier in the retransmission instruction packet may be located in a flag bit in a DSS option of the MPTCP.

The DSS of the MPTCP indicates a data flow state of a sub-traffic in an MPTCP session. To enable the transmit end to identify the retransmission instruction packet, the flag bit in the DSS of the MPTCP may be filled with the identifier. For example, a sixth flag bit in the DSS of the MPTCP may be filled with the identifier.

In the foregoing example, a packet whose flag bit is filled with the identifier is the retransmission instruction packet.

In an embodiment of the present disclosure, the sending module 903 is specifically configured to send a repeated duplicate acknowledgment packet of the blocking packet for three consecutive times on the target subflow connection, where the duplicate acknowledgment packet of the blocking packet is used to indicate expectation of receiving the blocking packet. The duplicate acknowledgment packet sent for three consecutive times is equivalent to the retransmission instruction packet.

In the foregoing example, receiving the repeated duplicate acknowledgment packet for three times is used as a trigger condition for triggering retransmission of the blocking packet, thereby shortening a delay.

In an embodiment of the present disclosure, a network component may be an HG, a HAAP, or an AR.

Figure 10:
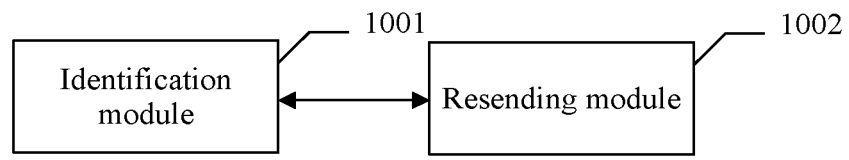
FIG. 10 is a schematic structural diagram of a network component according to another embodiment of the present disclosure.

FIG. 10 is a schematic structural diagram of a network component according to another embodiment of the present disclosure, and the network component corresponds to the packet transmission method. The network component specifically includes the following modules.

An identification module 1001 is configured to identify a retransmission instruction packet of a blocking packet from packets received on a plurality of subflow connections of an MPTCP.

The retransmission instruction packet may be identified from the packets received on the plurality of subflow connections of the MPTCP, and the retransmission instruction packet includes a DSN of the blocking packet.

A determining module 1002 is configured to determine the DSN of the blocking packet based on the retransmission instruction packet.

For example, the retransmission instruction packet may include an identifier, and the identifier is used to identify that the retransmission instruction packet is a packet that is used to instruct a sending device of the blocking packet to retransmit the blocking packet. The retransmission instruction packet of the blocking packet may be identified by using the identifier in the retransmission instruction packet. The identifier may be located in a flag bit in a DSS option of the MPTCP.

For another example, if receiving a repeated duplicate acknowledgment packet of the blocking packet for three consecutive times, the network component may identify the retransmission instruction packet.

After identifying the retransmission instruction packet, the network component may determine the DSN of the blocking packet based on the retransmission instruction packet.

A resending module 1003 is configured to resend the blocking packet corresponding to the determined DSN on a subflow connection that receives the retransmission instruction packet.

In this embodiment of the present disclosure, after receiving the retransmission instruction packet on the plurality of subflow connections of the MPTCP, the identification module 1001 identifies the retransmission instruction packet. The determining module 1002 determines the DSN of the blocking packet based on the retransmission instruction packet. Then, the resending module 1003 resends the blocking packet corresponding to the DSN on the subflow connection that receives the retransmission instruction packet. After receiving the retransmission instruction packet, the network component immediately resends the corresponding blocking packet, thereby shortening a delay.

In an embodiment of the present disclosure, a network component may be an HG, a HAAP, or an AR.

Figure 11:
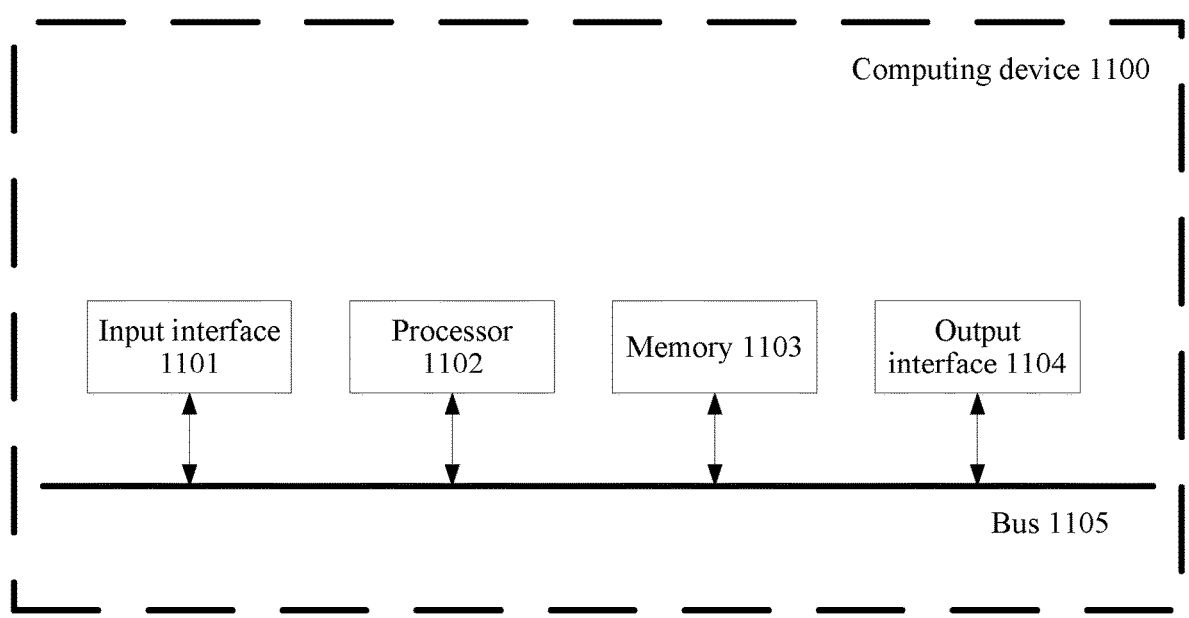
FIG. 11 is a structural diagram of an example hardware architecture of a computing device that can implement a packet transmission method and a network component according to embodiments of the present disclosure.

FIG. 11 is a structural diagram of an example hardware architecture of a computing device that can implement a packet transmission method and a network component according to embodiments of the present disclosure. As shown in FIG. 11, the computing device 1100 includes an input interface 1101, a processor 1102, a memory 1103, and an output interface 1104.

The input interface 1101, the processor 1102, the memory 1103, and the output interface 1104 are interconnected by using a bus 1105.

Specifically, input information is transmitted to the processor 1102 by using the input interface 1101. The processor 1102 processes the input information based on a computer executable instruction stored in the memory 1103, to generate output information, and temporarily or permanently stores the output information in the memory 1103, and then the output information is output by using the output interface 1104.

The computing device 1100 may perform the steps in the foregoing packet transmission method in this disclosure.

The processor 1102 may be one or more central processing units (CPU). When the processor 1102 or the processor 1102 is one CPU, the CPU may be a single-core CPU or a multi-core CPU.

The memory 1103 may be, but is not limited to, one or more of a random access memory (RAM), a read-only memory (ROM), an erasable programmable read only memory (EPROM), a compact disc read-only memory (CD-ROM), a hard disk, and the like. The memory 1103 is configured to store program code.

It may be understood that, in this embodiment, functions of any module or all modules provided in FIG. 9 and FIG. 10 may be implemented by the central processing unit 1102 shown in FIG. 11.

All or some of the foregoing embodiments may be implemented through software, hardware, firmware, or any combination thereof. When some or all of the foregoing embodiments are implemented in a form of a computer program product, the computer program product includes one or more computer instructions. When the computer program instructions are loaded or executed on the computer, the procedures or functions according to the embodiments of the present disclosure are all or partially generated. The computer may be a general-purpose computer, a dedicated computer, a computer network, or another programmable apparatus. The computer instructions may be stored in a computer-readable storage medium or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The embodiments in this specification are all described in a progressive manner. For same or similar parts in the embodiments, refer to these embodiments. Each embodiment focuses on a difference from other embodiments. Especially, an apparatus embodiment and a system embodiment are basically similar to a method embodiment, and therefore are described briefly. For related parts, refer to partial descriptions in the method embodiment.

What is claimed is:

1. A packet transmission method, comprising:
receiving, by a network component, packets on a plurality of subflow connections of a multipath transmission control protocol (MPTCP) connection, and determining, based on the received packets, that packets at an MPTCP layer are out of order;
determining, by the network component, that a blocking packet which is causing out-of-order receipt, is not received within a tolerance time, wherein the tolerance time is less than a largest retransmission timeout (RTO) in RTOs of the plurality of subflow connections, and is equal to a fraction of a difference between a first round trip time (RTT) and a second RTT, wherein the first RTT is a largest RTT in RTTs of the plurality of subflow connections and the second RTT is an RTT of a subflow connection in which a latest packet is received when the packets at the MPTCP layer are out of order; and
sending, by the network component, a retransmission instruction packet of the blocking packet on a target subflow connection in the plurality of subflow connections, wherein the retransmission instruction packet is used to instruct a sending device of the blocking packet to retransmit the blocking packet.

2. The packet transmission method of claim 1, wherein determining, based on the received packets, that packets at the MPTCP layer are out of order comprises:
performing packet assembly based on data sequence numbers (DSNs) of the received packets in the plurality of subflow connections of the MPTCP, and when determining that the DSNs of the received packets are nonconsecutive, determining that the packets at the MPTCP layer are out of order.

3. The packet transmission method of claim 1, wherein the tolerance time is equal to ½ of the difference between the first RTT and the second RTT.

4. The packet transmission method of claim 1, wherein the retransmission instruction packet comprises an identifier, and the identifier is used to identify that the retransmission instruction packet is a packet that is used to instruct the sending device of the blocking packet to retransmit the blocking packet.

5. The packet transmission method of claim 4, wherein the identifier is located in a flag bit in a data sequence signal (DSS) option of the MPTCP.

6. The packet transmission method of claim 1, wherein sending the retransmission instruction packet of the blocking packet on a target subflow connection in the plurality of subflow connections comprises:
sending a repeated duplicate acknowledgment packet of the blocking packet three consecutive times on the target subflow connection.

7. The packet transmission method of claim 1, wherein the network component comprises one or more of a home gateway (HG), a hybrid access aggregation point (HAAP), or an access router (AR).

8. The packet transmission method of claim 1, wherein before the sending, by the network component, a retransmission instruction packet of the blocking packet on the target subflow connection in the plurality of subflow connections, the method further comprises:
selecting a subflow connection with a shortest estimated delay from the plurality of subflow connections as the target subflow connection.

9. A network component comprising:
a processor; and
a non-transitory computer readable medium which contains computer-executable instructions;
the processor is configured to execute the computer-executable instructions to enable the network component to perform operations comprising:
receiving packets on a plurality of subflow connections of a multipath transmission control protocol (MPTCP) connection, and determining, based on the received packets, that packets at an MPTCP layer are out of order;
determining that a blocking packet, which is causing out-of-order receipt, is not received within a tolerance time, wherein the tolerance time is less than a largest retransmission timeout (RTO) in RTOs of the plurality of subflow connections, and is equal to a fraction of a difference between a first round trip time (RTT) and a second RTT, wherein the first RTT is a largest RTT in RTTs of the plurality of subflow connections and the second RTT is an RTT of a subflow connection in which a latest packet is received when the packets at the MPTCP layer are out of order; and
sending a retransmission instruction packet of the blocking packet on a target subflow connection in the plurality of subflow connection, wherein the retransmission instruction packet is used to instruct a sending device of the blocking packet to retransmit the blocking packet.

10. The network component of claim 9, wherein determining, based on the received packets, that packets at the MPTCP layer are out of order comprises:
performing packet assembly based on data sequence numbers (DSNs) of the received packets in the plurality of subflow connections of the MPTCP, and when determining that the DSNs of the received packets are nonconsecutive, determining that the packets at the MPTCP layer are out of order.

11. The network component of claim 9, wherein the tolerance time is equal to ½ of the difference between the first RTT and the second RTT.

12. The network component of claim 9, wherein the retransmission instruction packet comprises an identifier, and the identifier is used to identify that the retransmission instruction packet is a packet that is used to instruct the sending device of the blocking packet to retransmit the blocking packet.

13. The network component of claim 12, wherein the identifier is located in a flag bit in a data sequence signal (DSS) option of the MPTCP.

14. The network component of claim 9, wherein sending a retransmission instruction packet of the blocking packet on the target subflow connection in the plurality of subflow connections comprises:
sending a repeated duplicate acknowledgment packet of the blocking packet for three consecutive times on the target subflow connection.

15. The network component of claim 9, wherein network component comprises one or more of a home gateway (HG), a hybrid access aggregation point (HAAP), or an access router (AR).

16. The network component of claim 9, wherein the processor is further configured to execute the computer-executable instructions to enable the network component to perform an operation comprising:
selecting a subflow connection with a shortest estimated delay from the plurality of subflow connections as the target subflow connection.

17. A non-transitory machine-readable medium having instructions stored therein, which when executed by a processor, cause the processor to perform operations comprising:
receiving packets on a plurality of subflow connections of a multipath transmission control protocol (MPTCP) connection, and determining, based on the received packets, that packets at an MPTCP layer are out of order;
determining that a blocking packet, which is causing out-of-order receipt, is not received within a tolerance time, wherein the tolerance time is less than a largest retransmission timeout (RTO) in RTOs of the plurality of subflow connections, and is equal to a fraction of a difference between a first round trip time (RTT) and a second RTT, wherein the first RTT is a largest RTT in RTTs of the plurality of subflow connections and the second RTT is an RTT of a subflow connection in which a latest packet is received when the packets at the MPTCP layer are out of order; and
sending a retransmission instruction packet of the blocking packet on a target subflow connection in the plurality of subflow connection, wherein the retransmission instruction packet is used to instruct a sending device of the blocking packet to retransmit the blocking packet.

18. The non-transitory machine-readable medium of claim 17, wherein determining, based on the received packets, that packets at the MPTCP layer are out of order comprises:
performing packet assembly based on data sequence numbers (DSNs) of the received packets in the plurality of subflow connections of the MPTCP, and when determining that the DSNs of the received packets are nonconsecutive, determining that the packets at the MPTCP layer are out of order.

19. The non-transitory machine-readable medium of claim 17, wherein the tolerance time is equal to ½ of the difference between the first RTT and the second RTT.

20. The non-transitory machine-readable medium of claim 17, wherein the retransmission instruction packet comprises an identifier, and the identifier is used to identify that the retransmission instruction packet is a packet that is used to instruct the sending device of the blocking packet to retransmit the blocking packet.

* * * * *